US011042574B2

(12) United States Patent
Berentsen et al.

(10) Patent No.: US 11,042,574 B2
(45) Date of Patent: Jun. 22, 2021

(54) CONTEXTUAL ENHANCING OF CONTENT PARTICIPATION IN SEARCH RESULTS

(71) Applicant: International Business Machines Corporation, Armonk, NY (US)

(72) Inventors: Lambert Scott Berentsen, Jonestown, TX (US); Gregory J. Boss, Saginaw, MI (US); Sachin K. Mahajan, Pune (IN); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1217 days.

(21) Appl. No.: 15/285,746

(22) Filed: Oct. 5, 2016

(65) Prior Publication Data

US 2018/0096054 A1    Apr. 5, 2018

(51) Int. Cl.
*G06F 7/00* (2006.01)
*G06F 16/332* (2019.01)
*G06F 16/951* (2019.01)
*G06F 16/33* (2019.01)
*G06Q 30/02* (2012.01)

(52) U.S. Cl.
CPC ...... *G06F 16/3326* (2019.01); *G06F 16/3332* (2019.01); *G06F 16/951* (2019.01); *G06Q 30/0277* (2013.01)

(58) Field of Classification Search
CPC ............. G06F 17/2264; G06F 16/3326; G06F 16/951; G06F 16/3332; G06F 16/36; G06F 16/367; G06F 16/48; G06Q 30/0277
See application file for complete search history.

(56) References Cited

U.S. PATENT DOCUMENTS

| | | | | |
|---|---|---|---|---|
| 7,117,207 B1 * | 10/2006 | Kerschberg | ........... | G06F 16/337 |
| 7,542,969 B1 * | 6/2009 | Rappaport | ............ | G06F 16/338 |
| 7,827,125 B1 * | 11/2010 | Rennison | .............. | G06F 16/319 |
| | | | | 706/14 |
| 8,429,106 B2 * | 4/2013 | Downs | .................. | G06F 40/258 |
| | | | | 706/21 |

(Continued)

OTHER PUBLICATIONS

Anonymously; A method and system of automatic web content recommend, Jul. 15, 2011.

(Continued)

*Primary Examiner* — Mohammed R Uddin

(74) *Attorney, Agent, or Firm* — Garg Law Firm, PLLC; Rakesh Garg; Anthony V England

(57) ABSTRACT

A search term used in an online search is analyzed to determine a concept corresponding to the search term, the concept being present in an ontology related to a subject-matter domain of the search term. A set of concepts is selected from the ontology, including a related concept related to the concept in the organization of the ontology. A set of subscriber data sources is determined where a subscriber data source in the set subscribes to a concept in the set of concepts. From the set of subscriber data sources, a subset of those subscriber data sources is identified whose data is not participating in a result set corresponding to the search term. A non-participation message is sent to a subscriber data source in the subset of subscriber data sources.

20 Claims, 5 Drawing Sheets

(56) References Cited

U.S. PATENT DOCUMENTS

| | | | |
|---|---|---|---|
| 8,626,576 B1* | 1/2014 | Pisaris-Henderson | ............... G06Q 30/0241 705/14.1 |
| 8,650,210 B1* | 2/2014 | Cheng | ............... G06F 3/167 707/770 |
| 2003/0212673 A1* | 11/2003 | Kadayam | ............... G06F 16/951 |
| 2006/0167896 A1* | 7/2006 | Kapur | ............... G06F 16/9535 |
| 2007/0106659 A1* | 5/2007 | Lu | ............... G06F 16/9535 |
| 2007/0255702 A1* | 11/2007 | Orme | ............... G06F 16/338 |
| 2008/0091633 A1* | 4/2008 | Rappaport | ............... G06N 5/022 706/50 |
| 2008/0201434 A1* | 8/2008 | Holmes | ............... G06Q 10/10 709/206 |
| 2008/0301089 A1* | 12/2008 | Makeev | ............... G06F 16/3326 |
| 2009/0089275 A1 | 4/2009 | Drory et al. | |
| 2009/0248625 A1* | 10/2009 | Adelman | ............... G06F 16/24547 |
| 2010/0030734 A1* | 2/2010 | Chunilal | ............... G06Q 10/00 707/770 |
| 2010/0049766 A1* | 2/2010 | Sweeney | ............... G06N 5/02 707/737 |
| 2010/0161580 A1* | 6/2010 | Chipman | ............... G06F 16/44 707/706 |
| 2011/0004588 A1* | 1/2011 | Leitersdorf | ............... G06F 16/951 707/711 |
| 2011/0208822 A1* | 8/2011 | Rathod | ............... G06F 16/9535 709/206 |
| 2014/0280179 A1* | 9/2014 | Coleman | ............... G06F 16/3323 707/740 |
| 2015/0149274 A1 | 5/2015 | William | |
| 2015/0227623 A1 | 8/2015 | Shein et al. | |

OTHER PUBLICATIONS

Anonymously; Extraction and Transformation of Dates from Web Content to Improve Relevancy and Date Sorting for Search Results, Nov. 4, 2010.

Appendix P, 2016.

* cited by examiner

_US 11,042,574 B2_

CONTEXTUAL ENHANCING OF CONTENT PARTICIPATION IN SEARCH RESULTS

TECHNICAL FIELD

The present invention relates generally to a method, system, and computer program product for online searching of information. More particularly, the present invention relates to a method, system, and computer program product for contextual enhancing of content participation in search results.

BACKGROUND

Online search is a method of using a search engine, which executes on a computer, to search for information that is available in electronic form. Many search engines are presently available for performing online searches.

For example, some search engines, which execute on a server data processing system that is accessible over a data network, can be accessed by client-side component executing on a client data processing system, e.g., a user's computer system. A search application on a client data processing system, which can be accessed via an Application Program Interface (API), a command-line prompt, or some other integration mechanism can also be used on a client data processing system to access the server-side implementation of a search engine. For example, a search application can be a stand-alone interface for accessing the search engine.

As another example, the search application can be integrated into another application to enable the other application to access the search engine. A search bar embedded in a browser application on a client data processing system is one example of such an integrated client-side component.

Hereinafter, a "search engine" refers to the server-side implementation of the application that accesses the searchable data and performs a requested search query. Hereinafter, a "search application" refers to a client-side application or component, using which a user can send a search term or query to the search engine. A user of a search application can be a human, a hardware system, or a software application.

Typically, a user provides the search application a word, phrase, text snippet, or a string of alphanumeric or symbolic characters, as a search term. The search application communicates the search term to the search engine. The search engine forms a search query using the search term. The search engine accesses data, which comprises a repository of information or an index thereof stored electronically.

The search engine performs the search query on the data and obtains a result set. The result set includes data that corresponds to the search query. The search engine returns the result set to the search application. The search application provides or presents the result set to the user.

In some cases, a search engine may perform some processing of the result set before sending the result set to the search application. For example, a search engine may insert advertisements into the result set, arrange the result set in some order, such as according to the age of the results in the result set, and the like.

Presently, it is quite common to receive a result set of hundreds if not thousands of results that correspond to a search term. Even when sorted, the sheer volume of data in the result set can overwhelm the user. Often, the user has to expend time and computing resources to process the data of at least a few irrelevant or less-than-useful results to reach the data of a result that appears to be relevant to the user's intention for searching.

For example, a user may have to click a Uniform Resource Locator (URL), download the content from the website of the URL, click through or scroll past at least some of the downloaded content, to conclude that the URL did not lead to information that is useful according to the user's intentions behind the search. The user then has to repeat this sequence of operation with other URLs in other results in the result set before finding a result that is satisfactory to the user, if any.

Some search engines return a preview of the contents of a result that is included in the result set. For example, a search engine may show a title of a result, a URL of the result, and one or two lines of text from the content at the URL as a preview. As another example, another search engine may show as a preview a thumbnail image of a website of a URL that is included in the result set. In rare cases, the user may find the information of interest in the preview, but in most cases, the previews only allow a user to quickly form an opinion about a particular result in the result set, without having to access the URL and read the content available there.

In some search engines, if a preview includes a portion of the search term, the search engines highlight that portion of the search term in the preview. This highlighting, such as by boldfacing, underlining, color-changing, or font-scaling the portion of the search term helps to draw the user's attention to the portion of the search term that caused the inclusion of the result in the result set. The drawing of the attention is also designed to aid the user in a speedy elimination of some results from consideration, and a quick evaluation of the relevance of a result to the search term.

SUMMARY

The illustrative embodiments provide a method, system, and computer program product. An embodiment includes a method that analyzes, using a processor and a memory, a search term used in an online search, to determine a concept corresponding to the search term, the concept being present in an ontology related to a subject-matter domain of the search term. The embodiment selects a set of concepts from the ontology, the set of concepts including a related concept, wherein the related concept is related to the concept in the organization of the ontology. The embodiment determines a set of subscriber data sources, wherein a subscriber data source in the set of subscriber data sources subscribes to a concept in the set of concepts. The embodiment identifies, from the set of subscriber data sources, a subset of those subscriber data sources whose data is not participating in a result set corresponding to the search term. The embodiment sends a non-participation message to a subscriber data source in the subset of subscriber data sources.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
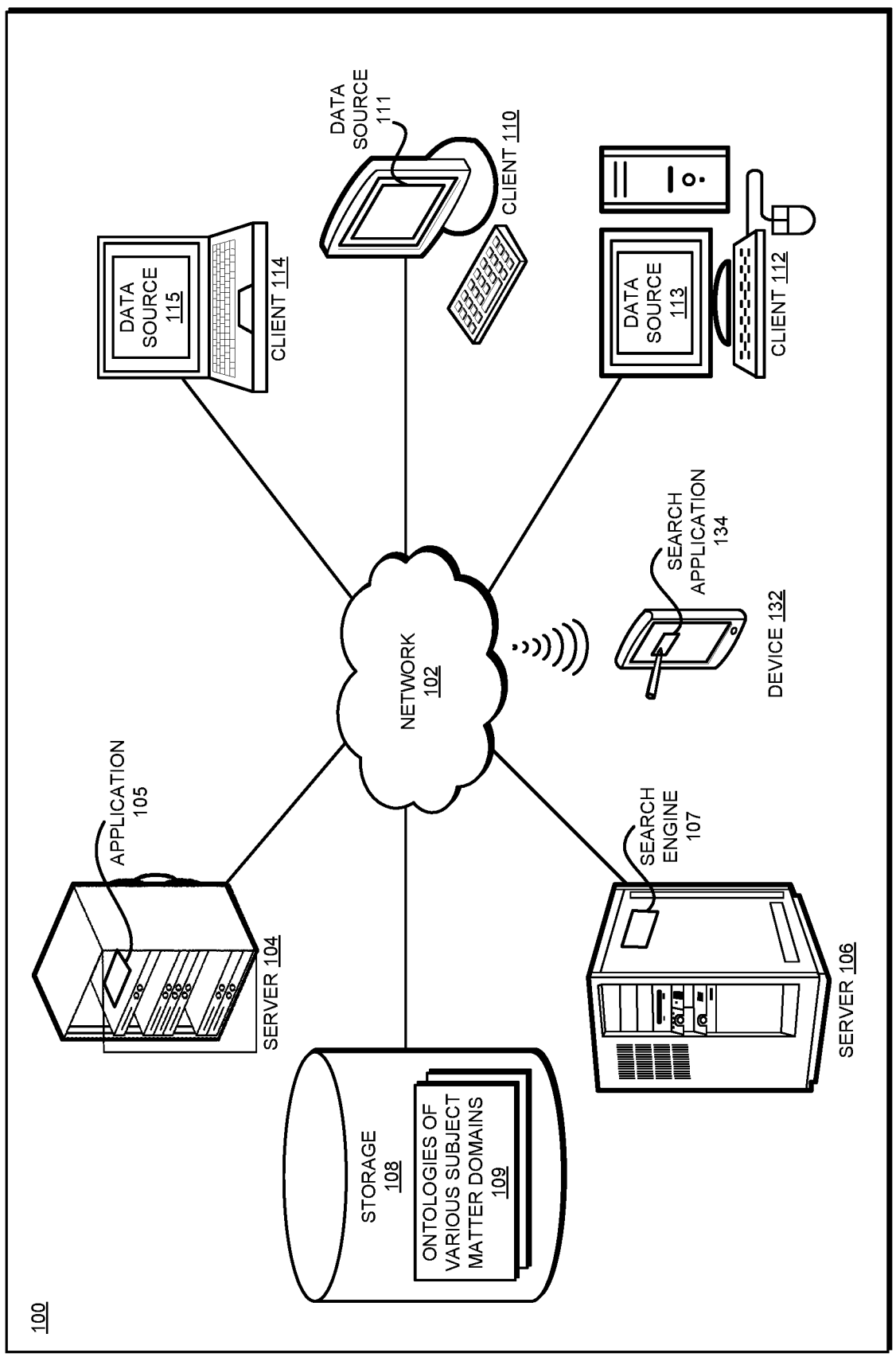
FIG. 1 depicts a block diagram of a network of data processing systems in which illustrative embodiments may be implemented.

The illustrative embodiments recognize that many data sources are interested in having their data participate in a result set of a search query. In an effort to increase the chances that their data will be referenced in a result set, an author or manager at a data source presently enrich the title and metadata related to their data.

Primarily, this enrichment is not much more than the source, the author, or the manager (collectively referred to hereinafter as "data source") simply adding keywords that they think are relevant to their data. The expectation of the data source in such an enrichment exercise is that a search query will use one or more of these keywords, causing the search engine to determine that the data with the keywords satisfies the query, and include their data in the result set.

Another way a data source increases the likelihood of their participation in a result set is through paid advertisement. Particularly, a search engine allows a data source to "buy" keywords (hereinafter "ad words"). Whenever a "bought" ad word is used in a search query, the data of the data source is inserted in the result set as an advertisement result.

In this manner of inserting data in a result set, the data source does not necessarily have to modify their data by adding keywords to the title or the metadata. The search engine does the insertion based the fact that the data source has bought advertisement-type insertion of their data in response to certain words in the queries.

The illustrative embodiments recognize that these presently used ways of improving the likelihood of data participation in a result set are principally based on the data source guessing which words the searchers might use. Either the data source guesses the words and inserts them as keywords in their data, or the data source guesses the ad words and buys them for inserting their data as an advertisement.

The illustrative embodiments further recognize that presently, a search engine returns nothing more than a summary of hits, i.e., number of times the data was used or referenced in result sets over a period. The hits may or may not include the keywords from the search terms that caused the hits.

The illustrative embodiments recognize that even when the hit count and the keywords are reported to a data source, the data source presently has no way of knowing where else their data could have participated. In other words, a data source has no way of knowing what other search queries—which used words other than the keywords or ad words—could potentially have included their data in the corresponding result sets. Therefore, the illustrative embodiments recognize that presently the data source has no way of modifying their content in an informed manner so that the likelihood of the participation of their data is increased in the future queries that are similar to the past missed opportunities of participation.

The illustrative embodiments recognize that the presently available tools or solutions do not address these needs or provide adequate solutions for these needs. The illustrative embodiments used to describe the invention generally address and solve the above-described problems and other problems related to contextual enhancing of content participation in search results.

An embodiment can be implemented as a software application. The application implementing an embodiment can be configured as a modification of an existing search engine, as a separate application that operates in conjunction with an existing search engine, a standalone application, or some combination thereof.

An ontology, as used herein, is an organization of information pertaining to a subject-matter domain. Stated another way, concepts present in a subject-matter domain are organized relative to one another in a suitable arrangement to express the relationships between those concepts. A hierarchy, a nodes-and-edges graph, and containerization are some non-limiting way of organizing an ontology.

Within an ontology, a concept can be expressed in words in a language. A concept can be expressed in more than one ways, using more than one words, using different words or phrases, or some combination thereof. An ontology may pertain to an entire subject-matter domain or a portion thereof, and in one or more languages.

An embodiment maintains one or more ontologies pertaining to one or more subject-matter domains. A data source subscribes to a concept in a subject-matter domain. A subscription can specify a concept in any suitable manner, including but not limited to selecting words or phrases that describe the concept. For example, a tire manufacturer may be a data source that may want information about their tires included in search queries pertaining to tires. In order to do so, where the present art requires the tire manufacturer to specify "tire", "snow tires", and other keywords in the information or as ad words, the embodiment allows the tire manufacturer to specify abstract concepts, such as by specifying "the rubber things that go on wheels".

According to the illustrative embodiments, the concept may be present in the subject-matter domain of tires, but also in the subject-matter domain of automotive, bicycles, skateboards, rubber industry, wheels, and many others. Furthermore, the concept of rubber things that go on wheels can specialize or develop into other concepts in an ontology, such as into tires and snow tires but also to tubes, solid tires, and the like.

Further according to the illustrative embodiments, the concept can evolve over time as new things are developed, new vocabulary develops in the given language, new language-specific ontologies are developed, cross-domain ontologies are developed, and for many other such reasons.

An embodiment analyzes a search query processed by a search engine. Particularly, the analysis determines a context of the search term in the search query. A context of a search term includes one or more concepts in which all or a part of the search term, or a possible equivalent thereof, can appear.

As a non-limiting example, assume that an ontology is a hierarchical organization of concepts, where a parent concept has a tree of other child concepts that are derived from the parent concept. The context of a search term can include not only the concept most closely related to the search term but also one or more child concepts that may exist in the hierarchy to which the concept is a parent node. Other types of relationships in other types of non-hierarchical ontologies also operate in a similar manner, where a concept related to a contextual concept also becomes a part of the context of the search term.

A subscription to a concept also operates in a similar manner. A subscription to a concept also subscribes the subscribing data source to the child concepts to which the subscribed-to concept is a parent. Other types of relationships in other types of non-hierarchical ontologies also operate in a similar manner, where a concept related to a subscribed-to concept also becomes a part of the subscription.

An embodiment also analyzes the result set to determine a set of data sources that are participating in the result set. Any manner of analysis, including but not limited to Natural Language Processing (NLP), structured data analysis, or other methods, can be utilized in the analysis of the search term, the result set, or both, as the case may be in a particular implementation.

Using the determined context of the search term, the embodiment identifies a set of subscribers who have subscribed to the concept. The embodiment identifies a subset of the set of subscribers who have subscribed to a concept of the search term but whose data is not participating in the result set.

An embodiment prepares a notification, pass-through message, or a feedback, (collectively and interchangeably referred to hereinafter as a "feedback") to a subscriber who has subscribed to a concept of the search term but whose data is not participating in the result set. In one embodiment, the notification includes the subscribed-to concept, the search term, the concept related to the search term, other child or related concepts of the context of the search term, or some combination thereof.

A subscriber who receives such a feedback is now much better informed as compared to the presently used solutions, to modify their data. The data modification using the notification allows the data source to selectively and judiciously add, omit, or change the contents of their data, e.g., the title, metadata, or some other portion of their data, to add words that are indicative of the concepts included in the notification. The data modification at the data source can even be automated to receive such notifications from an embodiment, and to automatically apply the specified concepts as changes to the data.

The manner of contextual enhancing of content participation in search results described herein is unavailable in the presently available methods. A method of an embodiment described herein, when implemented to execute on a device or data processing system, comprises substantial advancement of the functionality of that device or data processing system in allowing a data source to selectively and judiciously modify their data in correspondence with the suggested concepts to improve the likelihood of the inclusion of the modified data in a future result set for a similar query.

The illustrative embodiments are described with respect to certain types of search applications, search engines, search terms, search queries, results, result sets, concepts, ontologies, organizations, subscriptions, feedbacks, modifications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
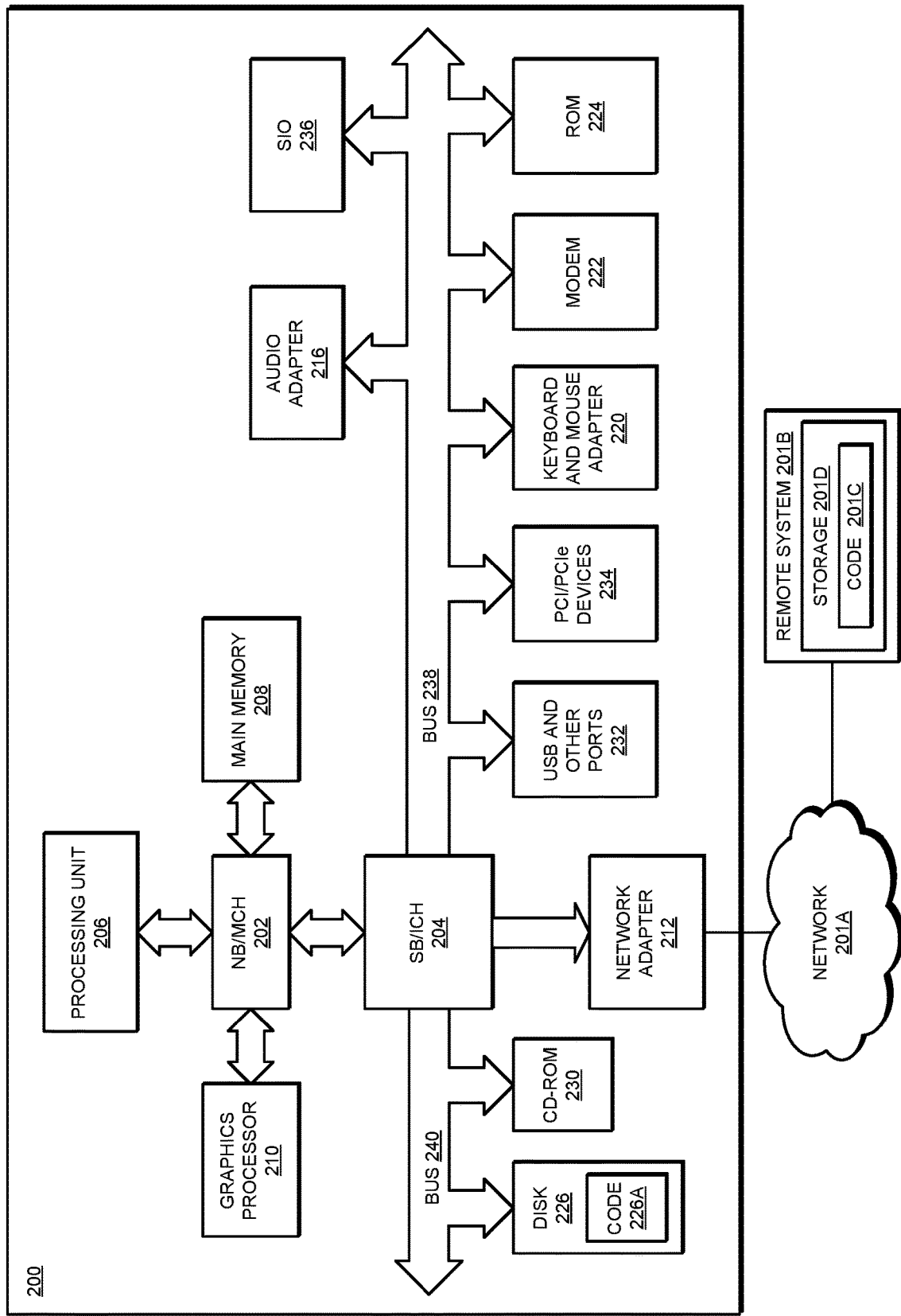
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Search application 134 submits a search query to search engine 107. search engine 107 produces a result set using data from one or more of data sources 111, 113, and 115. Application 105 operates in conjunction with search engine 107, and analyzes the search query and the corresponding result set using one or more ontologies 109, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
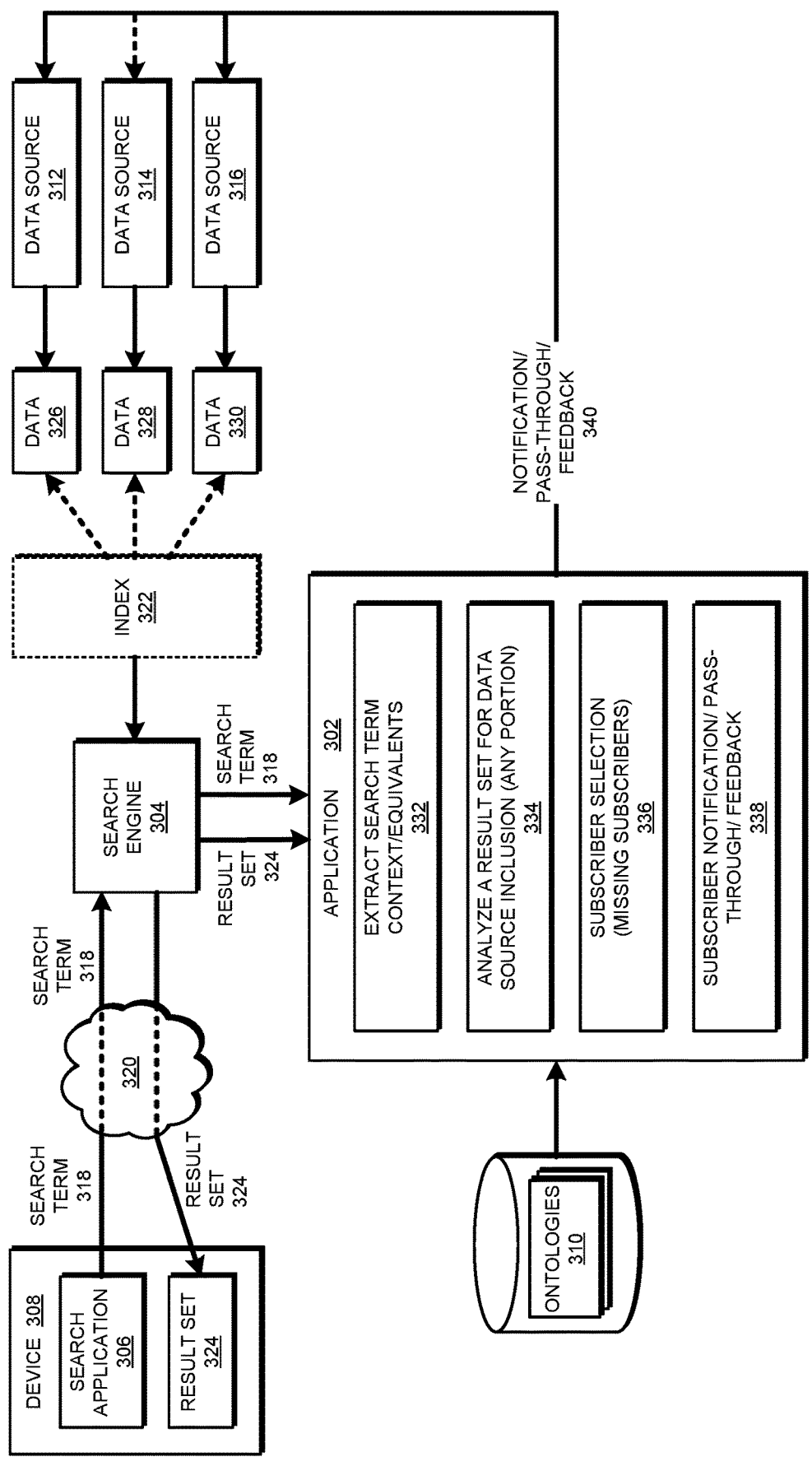
FIG. 3 depicts a block diagram of an example configuration for contextual enhancing of content participation in search results in accordance with an illustrative embodiment.

With reference to FIG. 3, this figure depicts a block diagram of an example configuration for contextual enhancing of content participation in search results in accordance with an illustrative embodiment. Application 302 is an example of application 105 in FIG. 1. Search engine 304 is an example of search engine 107 in FIG. 1. Search application 306 is an example of search application 134 in FIG. 1, and executes in device 308. Device 308 may be similar to device 132 or any client data processing systems described in FIG. 1. Ontologies 310 are examples of ontologies 109 in FIG. 1. Each of data source 312, 314, and 316 is an example of any of data sources 111, 113, and 115 in FIG. 1.

Search application 306 sends a search query including search term 318 to search engine 304 over network 320. Network 320 is an example of network 102 in FIG. 1. Search engine 304 executes the search query using index 322 to produce result set 324.

Index 322 is constructed using data 326, 328, and so on, up to data 330. As an example, data source 312 provides data 326, data source 314 provides data 328, and so on until data source 316 provides data 330.

Application 302 receives search term 318 and result set 324 as inputs from search engine 304. Component 332 extracts a context of search term 318 or an equivalent thereof in a manner described herein. An equivalent of a search term may be a word or phrase with a similar meaning, a word or a phrase in a different subject-matter domain than the domain of the search term, a different grammatical construction of the search term, in the same or a different language as the language of the search term, or some combination of these and other variations. Within the scope of the illustrative embodiments, a context of the search term can be extracted from the search term or an equivalent of the search term.

Component 334 analyzes the result set to determine which data sources are included or participating in the result set. Within the scope of the illustrative embodiments, the analysis of component 334 can be configured to analyze any portion of a result in the result set, such as, but not limited to a first line, title line, preview lines, or a summary line of a result.

Depending on the context identified by component 332, component 336 selects a set of subscribers that subscribe to the concepts corresponding to the context, as described herein. Component 336 compares the set of subscribers with the list of data sources that are participating in the result set. through this comparison, component 336 identifies a subset of the set of subscriber data sources who subscribe to a concept related to the context of the search term but whose data is not participating in the result set.

Component 338 constructs and transmits feedback 340 to each subscriber in the subset of subscribers. Different subscribers may receive different feedbacks depending upon their subscribed concepts. For example, data source 312 may not have participated in result set 324. Accordingly, feedback 340 to data source 312 may be configured to include the subscribed-to concept, the search term, the concept or concepts related to the search term which are related to the subscribed-to concept or concepts, other child or related concepts of the context of the search term, or some combination thereof.

As another example, data source 314 may have participated in result set 324 but to a limited extent. Accordingly, feedback 340 to data source 314 may be configured to include the subscribed-to concept that did not participate in result set 324, the search term, the concept or concepts related to the search term which are related to the subscribed-to but not participating concept or concepts, other child or related concepts of the context of the search term, or some combination thereof. As another example, data source 316 may not have participated in result set 324. Accordingly, feedback 340 to data source 312 may be configured to include the different set of concepts subscribed-to by data source 316, the search term, the concept or concepts related to the search term which are related to the subscribed-to concept or concepts, other child or related concepts of the context of the search term, or some combination thereof.

These examples of feedback messages are not intended to be limiting. From this disclosure, those of ordinary skill in the art will be able to conceive many other ways of constructing the feedback messages and their contents, and the same are contemplated within the scope of the illustrative embodiments.

Figure 4:
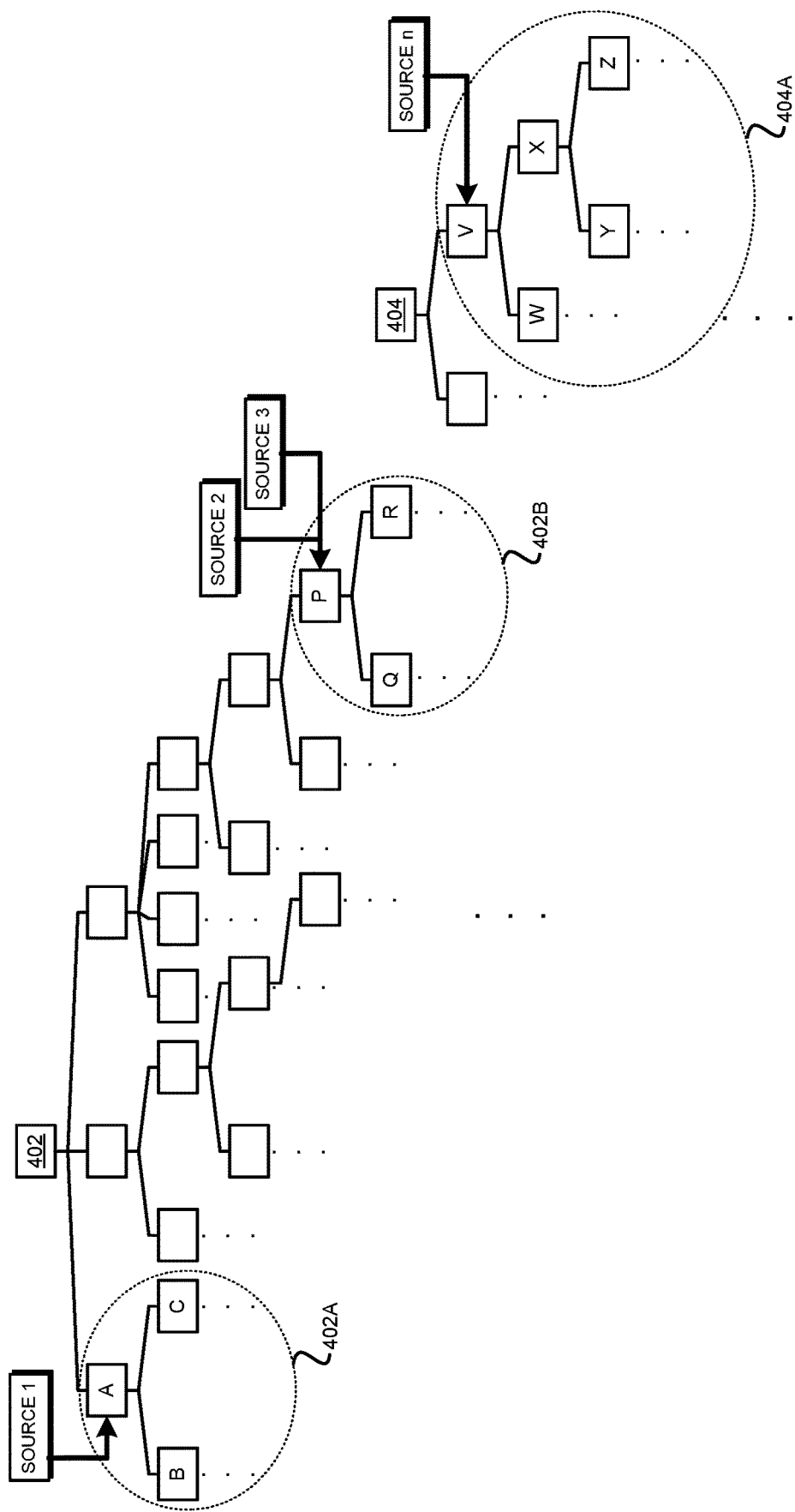
FIG. 4 depicts a block diagram of an example manner of concept subscription in accordance with an illustrative embodiment.

With reference to FIG. 4, this figure depicts a block diagram of an example manner of concept subscription in accordance with an illustrative embodiment. Ontologies 402 and 404 may be example ontologies in ontologies 310 in FIG. 3. Source 1 may be an example of data source 312, source 2 may be an example of data source 314, and source 3 may be an example of data source 316 in FIG. 3.

Ontologies 402 and 404 are depicted as hierarchical ontologies only as non-limiting examples. Suppose, as a non-limiting example, that source 1 subscribes to concept A in ontology 402. Application 302 regards source 1 as subscribing to portion 402A of ontology 402, which begins at concept A and includes concepts B, C and others as well. Similarly, source 2 subscribes to concept P in ontology 402 and application 302 regards source 2 as subscribing to portion 402B of ontology 402, which begins at concept P and includes concepts Q, R and others.

More than one subscriber can subscribe to a concept. For example, source 3 is also deemed to be subscribing to portion 402B of ontology 402 by virtue of source 3's subscription to concept P.

Any number of subscribers can subscribe to any number of portions of any number of ontologies without limitation. For example, source n is shown to subscribe to portion 404A of ontology 404 by virtue of subscribing to concept V in ontology 404.

Figure 5:
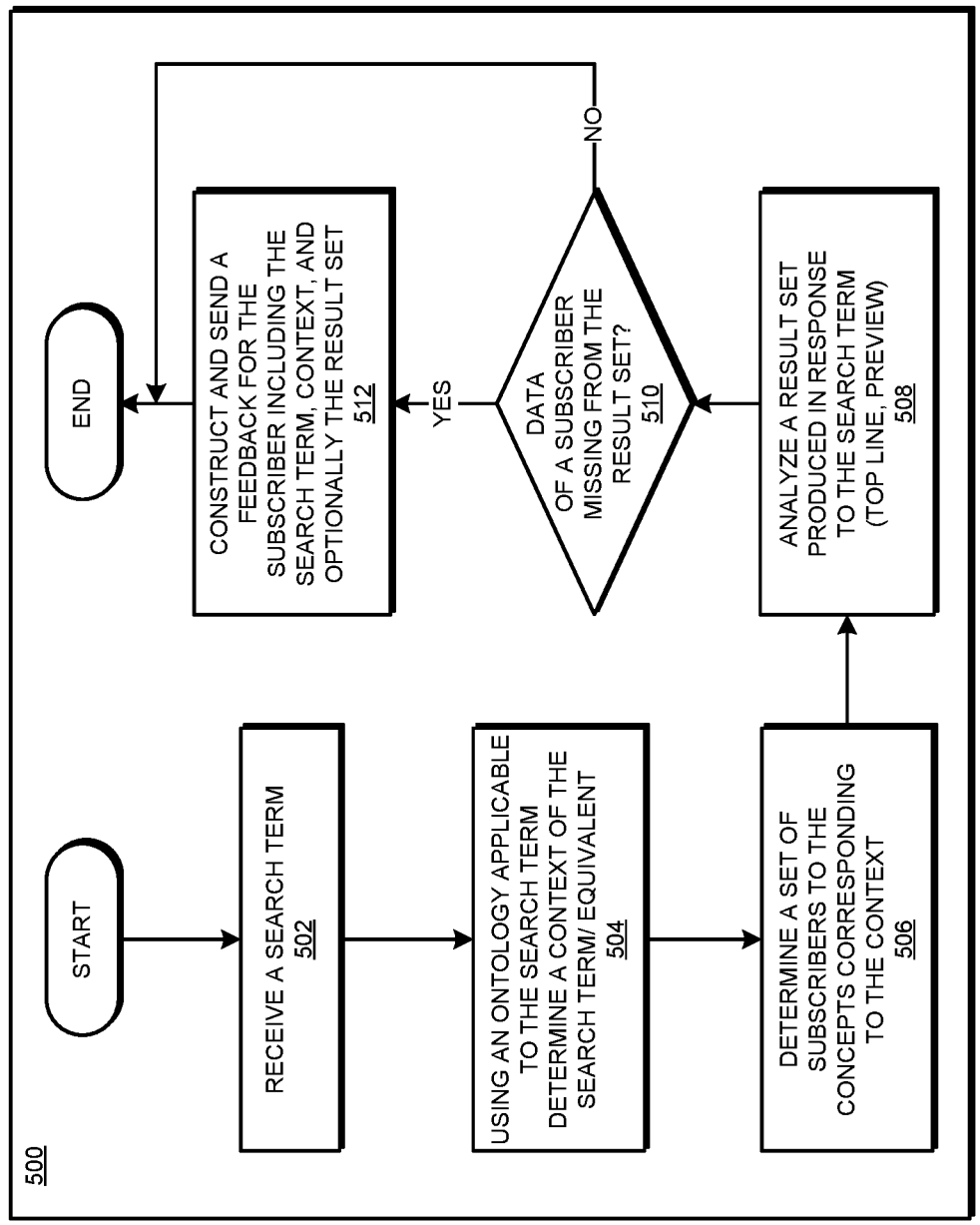
FIG. 5 depicts a flowchart of an example process for contextual enhancing of content participation in search results in accordance with an illustrative embodiment.

With reference to FIG. 5, this figure depicts a flowchart of an example process for contextual enhancing of content participation in search results in accordance with an illustrative embodiment. Process 500 can be implemented in application 302 in FIG. 3.

The application receives a search term (block 502). The application uses an ontology applicable to the search term to determine a context of the search term, a portion of the search term, or an equivalent thereof (block 504). The application determines a set of subscriber data sources who have subscribed to the determined concepts corresponding to the context of the search term (block 506).

The application analyzes the result set corresponding to the search term (block 508). The analysis may be of any part of a result in the result set, as described herein. The application determines whether the data of a subscriber is missing from the result set (block 510). If no subscriber's data is missing from the result set ("No" path of block 510), the application ends process 500 thereafter.

If the data of a subscriber from the set is missing from the result set ("Yes" path of block 510), the application constructs a feedback message for the subscriber whose data is missing and sends the feedback to that subscriber (block 512). The application ends process 500 thereafter.

Thus, a computer implemented method, system or apparatus, and computer program product are provided in the illustrative embodiments for contextual enhancing of content participation in search results and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing, by an application using a processor and a memory, a search term received by the application that was used by a search engine performing an online search that produced a result set received by the application, the analyzing comprising determining a specified concept corresponding to the search term, the specified concept being present in an ontology related to a subject-matter domain of the search term;
selecting a set of concepts from the ontology, the set of concepts including a related concept, wherein the related concept is related to the specified concept in an organization of the ontology;
determining a set of subscriber data sources that subscribe to the specified concept in the set of concepts so as to have their data included in response to search queries related to the specified concept;
identifying, from the set of subscriber data sources, a subscriber data source based on determining that data of the subscriber data source is not included in the result set; and
sending a non-participation message from the application to the subscriber data source regarding the data of the subscriber data source that is not included in the result set.

2. The method of claim 1, further comprising:
analyzing a result in the result set;
identifying a contributing data source that contributed the result to the result set;

regarding, after analyzing a determined portion of the result set, the subscriber data source remaining in the set of subscriber data sources as also being in a subset of subscriber data sources.

3. The method of claim 1, wherein the subscriber data source subscribes to the specified concept, and wherein the non-participation message comprises the related concept.

4. The method of claim 1, wherein an additional subscriber data source subscribes to the related concept, and wherein an additional non-participation message to the additional subscriber data source comprises the specified concept.

5. The method of claim 1, wherein the specified concept is present in a first ontology and the related concept is selected from a second ontology.

6. The method of claim 1, further comprising:
determining an equivalent of the search term; and
determining, as a part of the analyzing of the search term, a second concept corresponding to the equivalent of the search term.

7. The method of claim 6, wherein the equivalent is in a second subject-matter domain, and the second concept is present in a second ontology related to the second subject-matter domain.

8. The method of claim 1, further comprising:
causing, responsive to sending the non-participation message, the subscriber data source to make a modification to the data, wherein the modification causes the data to be included in a second result set corresponding to a second search term, the second search term and the search term being related to the specified concept.

9. A computer usable program product comprising one or more computer-readable storage devices, and program instructions stored on at least one of the one or more storage devices, the stored program instructions comprising:
program instructions to analyze, by an application using a processor and a memory, a search term received by the application that was used by a search engine performing an online search that produced a result set received by the application, the analyzing comprising determining a specified concept corresponding to the search term, the specified concept being present in an ontology related to a subject-matter domain of the search term;
program instructions to select a set of concepts from the ontology, the set of concepts including a related concept, wherein the related concept is related to the specified concept in an organization of the ontology;
program instructions to determine a set of subscriber data sources that subscribe to the specified concept in the set of concepts so as to have their data included in response to search queries related to the specified concept;
program instructions to identify, from the set of subscriber data sources, a subscriber data source based on determining that data of the subscriber data source is not included in the result set; and
program instructions to send a non-participation message from the application to the subscriber data source regarding the data of the subscriber data source that is not included in the result set.

10. The computer usable program product of claim 9, further comprising:
program instructions to analyze a result in the result set;
program instructions to identify a contributing data source that contributed the result to the result set; and
program instructions to regard, after analyzing a determined portion of the result set, the subscriber data source remaining in the set of subscriber data sources as also being in a subset of subscriber data sources.

11. The computer usable program product of claim 9, wherein the subscriber data source subscribes to the specified concept, and wherein the non-participation message comprises the related concept.

12. The computer usable program product of claim 9, wherein an additional subscriber data source subscribes to the related concept, and wherein an additional non-participation message to the additional subscriber data source comprises the specified concept.

13. The computer usable program product of claim 9, wherein the specified concept is present in a first ontology and the related concept is selected from a second ontology.

14. The computer usable program product of claim 9, further comprising:
program instructions to determine an equivalent of the search term; and
program instructions to determine, as a part of the analyzing of the search term, a second concept corresponding to the equivalent of the search term.

15. The computer usable program product of claim 14, wherein the equivalent is in a second subject-matter domain, and the second concept is present in a second ontology related to the second subject-matter domain.

16. The computer usable program product of claim 9, further comprising:
program instructions to cause, responsive to sending the non-participation message, the subscriber data source to make a modification to the data, wherein the modification causes the data to be included in a second result set corresponding to a second search term, the second search term and the search term being related to the specified concept.

17. The computer usable program product of claim 9, wherein the program instructions are stored in a computer readable storage device in a data processing system, and wherein the program instructions are transferred over a network from a remote data processing system.

18. The computer usable program product of claim 9, wherein the program instructions are stored in a computer readable storage device in a server data processing system, and wherein the program instructions are downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze, by an application using the at least one of the one or more processors and the at least one of the one or more memories, a search term received by the application that was used by a search engine performing an online search that produced a result set received by the application, the analyzing comprising determining a specified concept corresponding to the search term, the specified concept being present in an ontology related to a subject-matter domain of the search term;
program instructions to select a set of concepts from the ontology, the set of concepts including a related concept, wherein the related concept is related to the specified concept in an organization of the ontology;

program instructions to determine a set of subscriber data sources that subscribe to the specified concept in the set of concepts so as to have their data included in response to search queries related to the specified concept;

program instructions to identify, from the set of subscriber data sources, a subscriber data source based on determining that data of the subscriber data source is not included in the result set; and program instructions to send a non-participation message from the application to the subscriber data source regarding the data of the subscriber data source that is not included in the result set.

20. The computer system of claim 19, further comprising:

program instructions to analyze a result in the result set;

program instructions to identify a contributing data source that contributed the result to the result set; and program instructions to regard, after analyzing a determined portion of the result set, the subscriber data source remaining in the set of subscriber data sources as also being in a subset of subscriber data sources.

* * * * *